US011611276B2

United States Patent
Roth et al.

(10) Patent No.: US 11,611,276 B2
(45) Date of Patent: Mar. 21, 2023

(54) CHARGE PUMP CIRCUIT

(71) Applicant: TAIWAN SEMICONDUCTOR MANUFACTURING COMPANY, LTD., Hsinchu (TW)

(72) Inventors: Alan Roth, Leander, TX (US); Eric Soenen, Austin, TX (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 14/956,061

(22) Filed: Dec. 1, 2015

(65) Prior Publication Data

US 2016/0164403 A1 Jun. 9, 2016

Related U.S. Application Data

(60) Provisional application No. 62/087,365, filed on Dec. 4, 2014.

(51) Int. Cl.
*H02M 3/07* (2006.01)
*G05F 1/10* (2006.01)

(52) U.S. Cl.
CPC .................. *H02M 3/073* (2013.01)

(58) Field of Classification Search
CPC .. H02M 3/073; H02M 3/07; H02M 2003/077; G11C 5/145; G05F 3/205

(Continued)

(56) References Cited

U.S. PATENT DOCUMENTS

| 5,489,870 A | 2/1996 | Arakawa |
| 6,023,188 A * | 2/2000 | Lee .......................... G05F 3/20 327/536 |

(Continued)

FOREIGN PATENT DOCUMENTS

| CN | 1187884 | 2/2005 |
| CN | 102468747 | 5/2012 |

(Continued)

OTHER PUBLICATIONS

Office Action dated Jan. 17, 2017 from corresponding application No. TW 104140470.

(Continued)

*Primary Examiner* — Quan Tra
(74) *Attorney, Agent, or Firm* — Hauptman Ham, LLP

(57) ABSTRACT

A charge pump circuit includes a sub-circuit, which is a pumping stage circuit or an output stage circuit. The sub-circuit includes an input terminal, an output terminal, a transistor, a first capacitive device, a first diode device, and a second diode device. The transistor has a first source/drain (S/D) terminal coupled with the input terminal, a second S/D terminal coupled with the output terminal, and a gate terminal. The first capacitive device has a first end coupled with the gate terminal of the transistor and a second end configured to receive a first driving signal. The first diode device has a cathode coupled with the second S/D terminal of the transistor and an anode coupled with the gate terminal of the transistor. The second diode device has a cathode coupled with the gate terminal of the transistor and an anode coupled with the second S/D terminal of the transistor.

20 Claims, 7 Drawing Sheets

(58) Field of Classification Search
USPC .......................................................... 327/536
See application file for complete search history.

(56) References Cited

U.S. PATENT DOCUMENTS

| | | | |
|---|---|---|---|
| 6,160,723 A | 12/2000 | Liu | |
| 6,297,974 B1* | 10/2001 | Ganesan | H02M 3/073 327/536 |
| 6,320,797 B1 | 11/2001 | Liu | |
| 6,552,600 B2* | 4/2003 | Walimbe | H02M 3/073 327/536 |
| 6,677,806 B2* | 1/2004 | Bloch | H02M 3/073 327/536 |
| 6,696,883 B1* | 2/2004 | Wilson | H02M 3/073 327/536 |
| 6,734,717 B2 | 5/2004 | Min | |
| 6,864,739 B2* | 3/2005 | Shor | H02M 3/073 327/536 |
| 7,208,996 B2 | 4/2007 | Suzuki et al. | |
| 7,576,593 B2* | 8/2009 | Chang | H02M 3/073 327/536 |
| 7,598,795 B2* | 10/2009 | Lee | H02M 3/073 327/536 |
| 8,390,365 B2* | 3/2013 | Chang | G11C 7/222 327/536 |
| 8,598,854 B2 | 12/2013 | Soenen et al. | |
| 8,629,694 B1 | 1/2014 | Wang et al. | |
| 8,629,706 B2 | 1/2014 | Chen et al. | |
| 8,816,670 B2 | 8/2014 | Lee et al. | |
| 8,981,836 B2* | 3/2015 | Kern | H03L 7/0895 363/60 |
| 2002/0000870 A1* | 1/2002 | Li | H02M 3/073 327/536 |
| 2003/0006825 A1* | 1/2003 | Lee | H02M 3/073 327/536 |
| 2005/0062520 A1 | 3/2005 | Kim et al. | |
| 2005/0194956 A1 | 9/2005 | Chen | |
| 2006/0290635 A1* | 12/2006 | Fratti | G09G 3/3685 345/98 |
| 2011/0133802 A1* | 6/2011 | Yamaguchi | H03K 5/2472 327/178 |
| 2012/0126763 A1 | 5/2012 | Yang | |
| 2012/0176186 A1 | 7/2012 | Chen et al. | |
| 2012/0223766 A1 | 9/2012 | Lin et al. | |
| 2013/0241510 A1 | 9/2013 | Shi et al. | |
| 2013/0307516 A1 | 11/2013 | Horng et al. | |
| 2013/0320944 A1 | 12/2013 | Siao | |
| 2013/0321069 A1* | 12/2013 | Yajima | H02M 3/073 327/536 |
| 2014/0002041 A1 | 1/2014 | Soenen et al. | |
| 2014/0266114 A1 | 9/2014 | Chern et al. | |
| 2015/0381034 A1* | 12/2015 | Chiu | H02M 3/07 327/536 |

FOREIGN PATENT DOCUMENTS

| | | |
|---|---|---|
| DE | 10157997 | 1/2003 |
| JP | 2001043690 | 2/2001 |
| JP | 2005192350 | 7/2014 |
| KR | 20010009333 | 2/2001 |
| KR | 20010026497 | 4/2001 |

OTHER PUBLICATIONS

Office Action dated Jul. 9, 2018 from corresponding application No. DE 102015121020.7.
Dickson et al., "On-Chip High-Voltage Generation in MNOS Integrated Circuits Using an Improved Voltage Multiplier Technique", IEEE Journal of Solid-State Circuits, vol. SC-11, No. 3, Jun. 1976; pp. 374-378.
Office Action dated Jul. 20, 2018 from corresponding application No. CN 201610072649.3.
Notice of Allowance dated Mar. 13, 2018 and English translation from corresponding application No. KR 10-2015-0172447.
Office Action dated Jan. 7, 2019 from corresponding application No. CN 201610072649.3.

* cited by examiner

CHARGE PUMP CIRCUIT

BACKGROUND

A charge pump circuit is a Direct Current (DC) to DC converter that generates a voltage having a voltage level higher (positive pump) than a voltage level of an input supply voltage or lower (negative pump) than a voltage level of a reference ground voltage. In some applications, a charge pump circuit includes capacitors as energy storage elements and transistors as storage transfer elements. In some applications, the transistors are turned on or off responsive to various control signals, and the control signals are bounded by the voltage levels of the input supply voltage and the reference ground voltage. Also, various drain/source terminals of the transistors have up/down shifted voltages by the operations of charging and level-shifting the voltage levels at the capacitors of the charge pump circuit. In some applications, the various up/down shifted voltages have voltage levels beyond the voltage range between the input supply voltage and the reference ground voltage.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
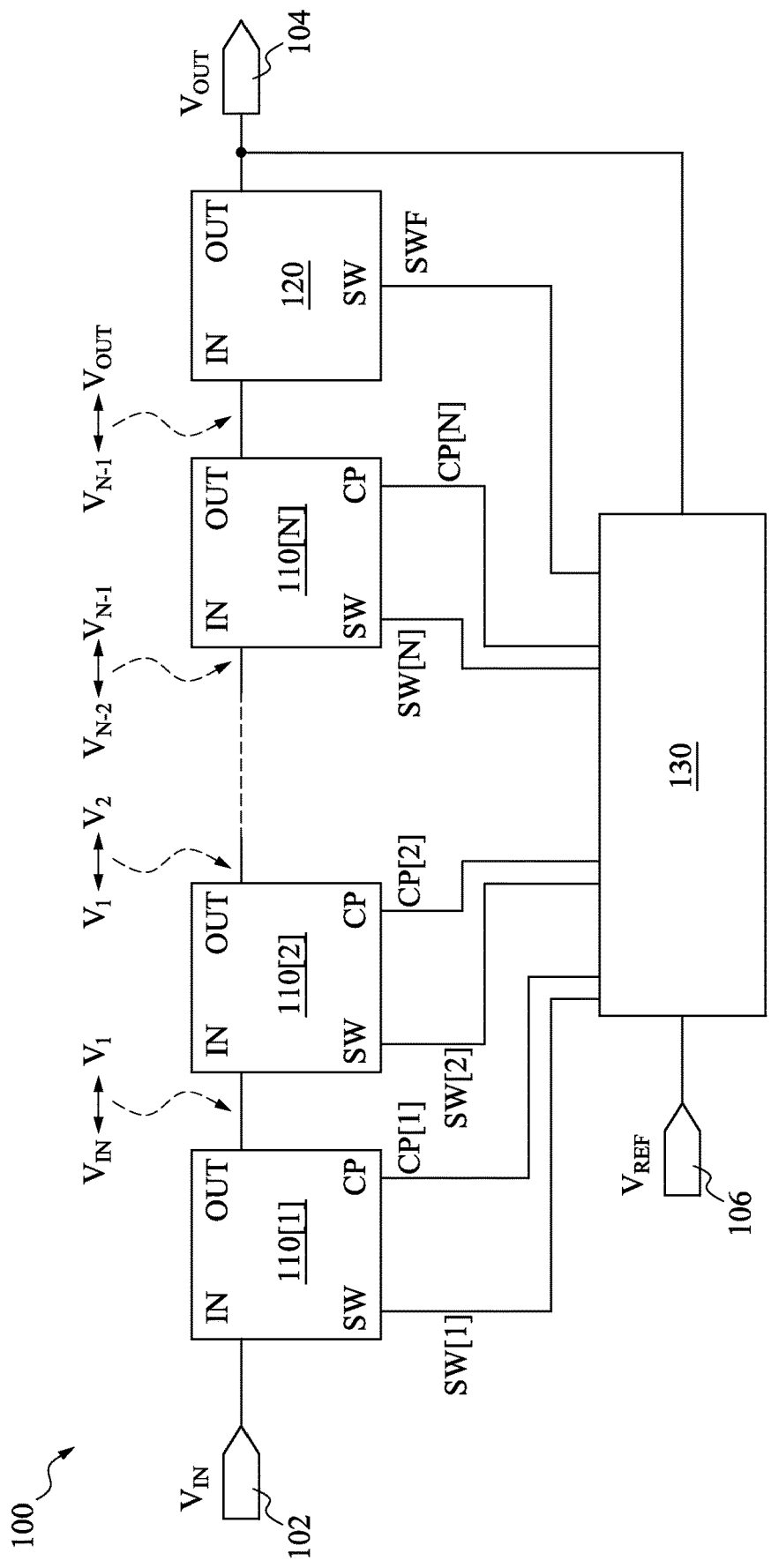
FIG. 1 is a functional block diagram of a charge pump circuit, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, a pumping stage circuit or an output stage circuit of a charge pump circuit includes a transistor, a capacitive device coupled with a gate terminal of the transistor, and two diode devices between the gate terminal and a source/drain (S/D) terminal of the transistor. The two diode devices are coupled in an inverse-parallel manner. Through a discharge path provided by one of the two diode devices and the DC separation between the gate terminal of the transistor and a driving signal, the voltage difference between the gate terminal and the S/D terminal is kept at about a forward voltage drop of the one of the two diode devices.

FIG. 1 is a functional block diagram of a charge pump circuit 100, in accordance with some embodiments. Charge pump circuit 100 includes an input node 102, an output node 104, a reference voltage terminal 106, N pumping stage circuits 110[1], 110[2], and 110[N], an output stage circuit 120, and a control circuit 130. N is a positive integer equal to or greater than one. Three pumping stage circuits 110[1], 110[2], and 110[N] (i.e., N=3) are depicted in FIG. 1 as a non-limiting example. Pumping stage circuits 110[1], 110[2], and 110[N] and output stage circuit 120 are coupled between input node 102 and output node 104. Control circuit 130 is coupled with output node 104 and reference voltage terminal 106, and is configured to generate a plurality of control signals SW[1], SW[2], SW[N], SWF, CP[1], CP[2], and CP[N] for controlling the operation of pumping stage circuits 110[1], 110[2], and 110[N] and output stage circuit 120.

Each pumping stage circuit of pumping stage circuits 110[1], 110[2], and 110[N] includes an input terminal IN, an output terminal OUT, and control signal terminals SW and CP. Output stage circuit 120 includes an input terminal IN, an output terminal OUT, and a control signal terminal SW. The input terminal IN of the first pumping stage circuit 110[1] is coupled with the input node 102. The output terminal OUT of a n-th pumping stage circuit 110[$n$] is coupled with the input terminal IN of a (n+1)-th pumping stage circuit 110[$n$+1], where n is a positive integer and 1≤n≤(N−1). The output terminal OUT of the N-th pumping stage circuit 110[N] is coupled with the input terminal IN of the output stage circuit 120. The output terminal OUT of the output stage circuit 120 is coupled with the output node 104.

In some embodiments, pumping stage circuits 110[1], 110[2], and 110[N] are configured to convert a voltage at input node 102 having a voltage level $V_{IN}$ to a predetermined voltage level $V_{OUT}$ at output node 104. During a steady state operation of charge pump circuit 100 and with transient overshoots or undershoots ignored, the voltage level at output terminal OUT of pumping stage circuit 110[1] switches between $V_{IN}$ and $V_1$; the voltage level at output terminal OUT of pumping stage circuit 110[2] switches between $V_1$ and $V_2$; the voltage level at input terminal IN of pumping stage circuit 110[N] switches between $V_{N-2}$ and $V_{N-1}$; and the voltage level at output terminal OUT of pumping stage circuit 110[N] switches between $V_{N-1}$ and $V_{OUT}$. In some embodiments, the voltage level at output terminal OUT of pumping stage circuit 110[n] switches between $V_{n-1}$ and $V_n$ according to the following equations:

$$\Delta V = V_{OUT} - V_N; \quad (1)$$

$$V_0 = V_N; \quad (2)$$

$$V_N = V_{OUT}; \text{ and} \quad (3)$$

$$V_n = V_N + n*(\Delta V/N), n \text{ is a positive integer and } 1 \leq n \leq (N-1) \quad (4)$$

In some embodiments, voltage level $V_{OUT}$ is greater than voltage level $V_{IN}$, charge pump circuit 100 functions as a positive pump, and $\Delta V$ thus has a positive value. In some embodiments, voltage level $V_{OUT}$ is less than voltage level $V_{IN}$, charge pump circuit 100 functions as a negative pump, and $\Delta V$ thus has a negative value.

Furthermore, control signal terminal SW of pumping stage circuit 110[1] is configured to receive control signal SW[1]; and control signal terminal CP of pumping stage circuit 110[1] is configured to receive control signal CP[1]. Control signal terminal SW of pumping stage circuit 110[2] is configured to receive control signal SW[2]; and control signal terminal CP of pumping stage circuit 110[2] is configured to receive control signal CP[2]. Control signal terminal SW of pumping stage circuit 110[N] is configured to receive control signal SW[N]; and control signal terminal CP of pumping stage circuit 110[N] is configured to receive control signal CP[N]. Control signal terminal SW of output stage circuit 120 is configured to receive control signal SWF. Example implementations and operation of pumping stage circuits 110[1], 110[2], and 110[N] and output stage circuit 120 in response to various control signals are further described in detail in conjunction with FIGS. 2 and 6.

Control circuit 130 is coupled with output node 104 and reference voltage terminal 106 and is configured to generate the plurality of control signals SW[1], SW[2], SW[N], SWF, CP[1], CP[2], and CP[N] based on the voltage level $V_{OUT}$ at output node 104 and a reference voltage level $V_{REF}$ at reference voltage terminal 106. In some embodiments, a signal SW[n] and a corresponding signal CP[n] have the same waveform. In some embodiments, a signal SW[n] has a pulse width of the voltage level (corresponding to the logic high value) different than that of a corresponding signal CP[n].

In some embodiments, all odd-numbered signals SW[n] have the same first waveform, and all even-numbered signals SW[n] have the same second waveform. In some embodiments, the first waveform and the second waveform are not at a voltage level corresponding to a logic high value concurrently, and odd-numbered signals SW[n] and even-numbered signals SW[n] are thus referred to as non-overlapping signals. In some embodiments, all odd-numbered signals CP[n] have the same third waveform, and all even-numbered signals CP[n] have the same fourth waveform. In some embodiments, the third waveform and the fourth waveform are not concurrently at the voltage level corresponding to a logic high value, and odd-numbered signals CP[n] and even-numbered signals CP[n] are thus referred to as non-overlapping signals.

Figure 4:
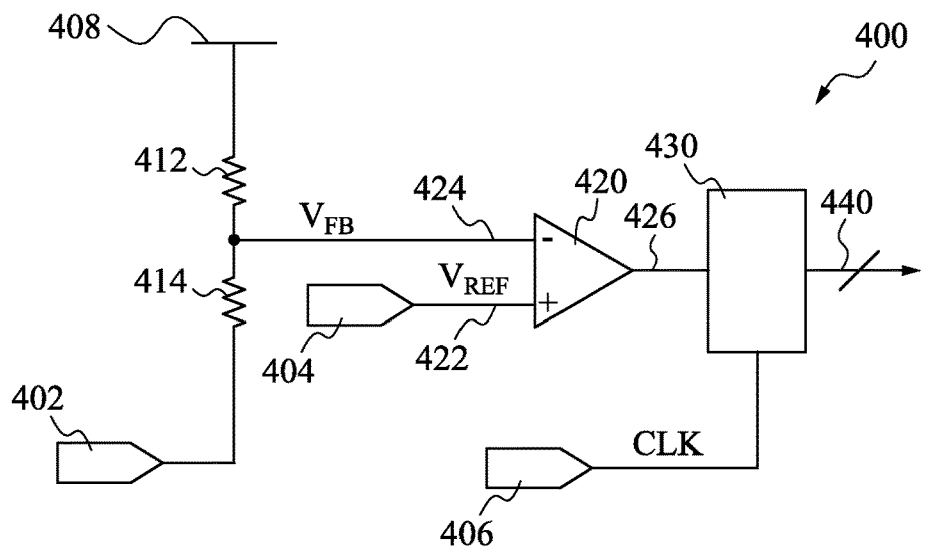
FIG. 4 is a circuit schematic diagram of a control circuit usable in the charge pump circuit in FIG. 1, in accordance with some embodiments.

An example implementation and operation of control circuit 130 are further described in detail in conjunction with FIG. 4.

Figure 2:
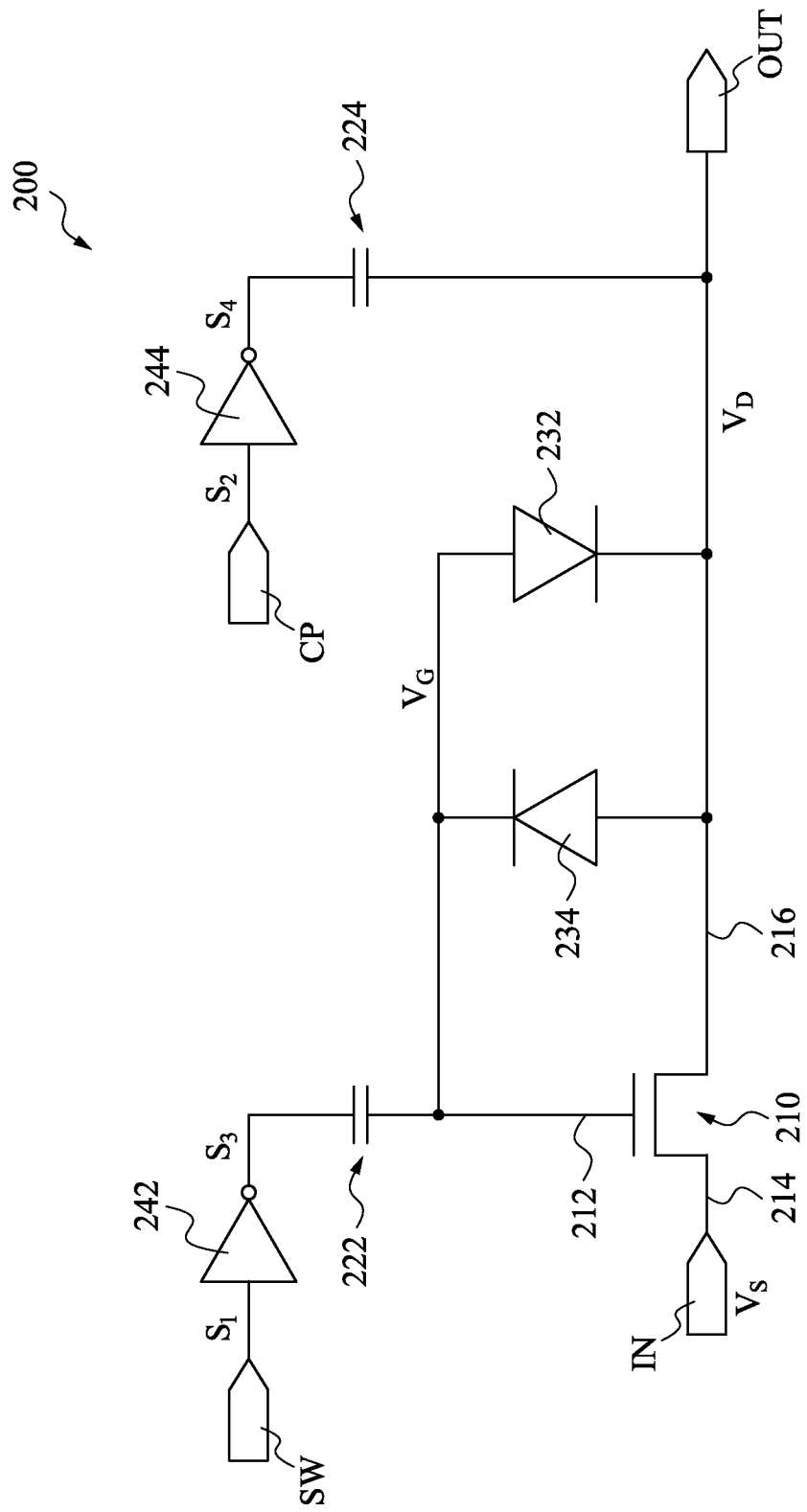
FIG. 2 is a circuit schematic diagram of a pumping stage circuit usable in the charge pump circuit in FIG. 1, in accordance with some embodiments.

FIG. 2 is a circuit schematic diagram of a pumping stage circuit 200 usable in charge pump circuit 100 in FIG. 1, in accordance with some embodiments. In some embodiments, pumping stage circuit 200 is usable as any one or all of pumping stage circuits 110[1], 110[2], and 110[N].

Pumping stage circuit 200 includes an input terminal IN, an output terminal OUT, and control signal terminals SW and CP variously corresponding to the terminals IN, OUT, SW, and CP of pumping stage circuits 110[1], 110[2], or 110[N] in FIG. 1. For illustration, input terminal IN has a voltage $V_S$, and output terminal OUT has a voltage $V_D$. Control signal terminal SW is configured to receive a control signal $S_1$, which corresponds to control signal SW[1], SW[2], or SW[N]. Control signal terminal CP is configured to receive a control signal $S_2$, which corresponds to control signal CP[1], CP[2], or CP[N].

Pumping stage circuit 200 includes a transistor 210, a first capacitive device 222, a second capacitive device 224, a first diode device 232, a second diode device 234, a first driver 242, and a second driver 244.

Transistor 210 is an N-type transistor and functions as a switching device. In some embodiments, transistor 210 is implemented by a P-type transistor or other suitable switching devices. Transistor 210 includes a gate terminal 212, a first S/D terminal 214, and a second S/D terminal 216. First S/D terminal 214 is coupled with input terminal IN. Second S/D terminal 216 is coupled with output terminal OUT. Gate terminal 212 has a voltage $V_G$.

First capacitive device 222 has a first end coupled with the gate terminal 212 of transistor 210 and a second end configured to receive a driving signal $S_3$. Second capacitive device 224 has a first end coupled with the output terminal OUT and a second end configured to receive a driving signal $S_4$. First diode device 232 has a cathode coupled with second S/D terminal 216 of transistor 210 and an anode coupled with gate terminal 212 of transistor 210. Second diode device 234 has a cathode coupled with gate terminal 212 of transistor 210 and an anode coupled with second S/D terminal 216 of transistor 210.

First driver 242 is configured to generate the driving signal $S_3$ based on the control signal $S_1$. Second driver 244 is configured to generate the driving signal $S_4$ based on the control signal $S_2$. First driver 242 is an inverter having an input terminal coupled with control signal terminal SW and an output terminal coupled with the second end of capacitive device 222. Second driver 244 is an inverter having an input terminal coupled with control signal terminal CP and an output terminal coupled with the second end of capacitive device 224. In some embodiments, first driver 242 and second driver 244 are implemented by one or a combination of an inverter, a buffer, a level shifter, or other suitable devices. In some embodiments, each signal of signal $S_1$, $S_2$, $S_3$, and $S_4$ switches between a first voltage level corresponding to a logic high value (hereinafter the "first logic high level") and a reference ground voltage level corresponding to a logic low value (hereinafter the "logic low level"). In some embodiments, each signal of signals $S_3$ and $S_4$ switches between the first logic high level and the logic low level, and each signal of signals $S_1$ and $S_2$ switches between a second voltage level corresponding to the logic high value (hereinafter the "second logic high level") and the logic low level. In some embodiments, the second logic high level is greater than the first logic high level.

A diode device has a forward voltage drop between an anode and a cathode thereof when the diode device is forward biased and conductive. In some embodiments, first diode device 232 has a forward voltage drop $V_{FB1}$, second diode device 234 has a forward voltage drop $V_{FB2}$, and forward voltage drop $V_{FB1}$ is greater than forward voltage drop $V_{FB2}$. Also, transistor 210 has a threshold voltage $V_{TH}$ between gate terminal 212 and S/D terminal 216. In some embodiments, forward voltage drop $V_{FB1}$ is greater than threshold voltage $V_{TH}$ of transistor 210.

In some embodiments, diode device 232 is configured to provide a discharge path between gate terminal 212 and S/D terminal 216 in order to reduce a voltage difference between voltage $V_G$ and voltage $V_D$ to be no greater than forward voltage drop $V_{FB1}$ of diode device 232 when diode device 232 is forward biased and conductive. In some embodiments, diode device 234 is configured to provide a discharge path between gate terminal 212 and S/D terminal 216 in order to limit a voltage difference between voltage $V_G$ and voltage $V_D$ to be no greater than forward voltage drop $V_{FB2}$ of diode device 234 when diode device 234 is forward biased and conductive. In some embodiments, diode devices 232 and 234 also provide conductive paths to reduce the peak voltage levels of voltage $V_G$ and voltage $V_D$ when these voltages are being switched in response to the transitions of signals $S_3$ and $S_4$ and by the operation of capacitive devices 222 and 224.

In operation, diode devices 232 and 234 thereby act to guarantee that the DC value on capacitor 222 is always in the correct range in order to turn on and off transistor 210.

In some embodiments, diode device 232 includes a series of one or more diodes and forward voltage drop $V_{FB1}$ of diode device 232 is the sum of the voltage drops of each diode of the diode series. In some embodiments, diode device 234 includes a series of one or more diodes and forward voltage drop $V_{FB2}$ of diode device 234 is the sum of the voltage drops of each diode of the diode series.

In operation, capacitive device 222 level-shifts driving signal $S_3$ such that the need to generate control signals having a large voltage swing is avoided. This feature simplifies circuit design and makes it possible to implement a charge pump without the costs associated with a high voltage capability. Detailed operation of various components of pumping stage circuit 200 is illustrated in conjunction with FIG. 6.

Figure 3:
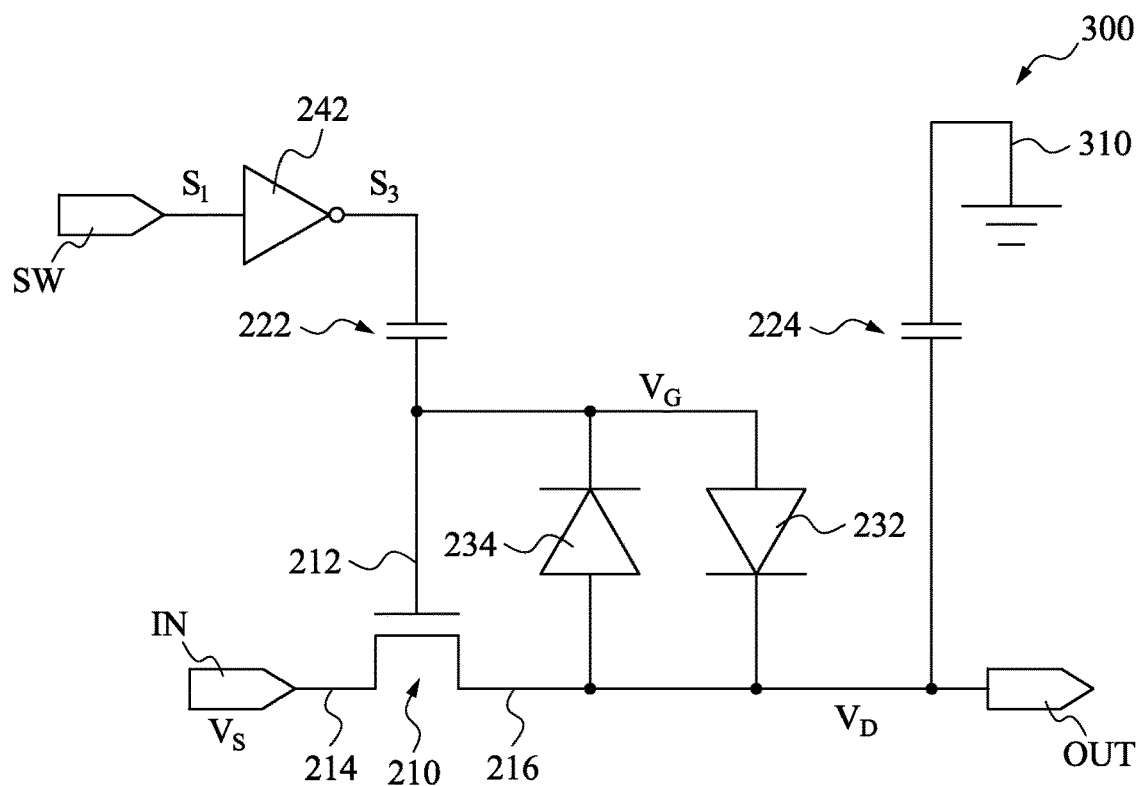
FIG. 3 is a circuit schematic diagram of an output stage circuit usable in the charge pump circuit in FIG. 1, in accordance with some embodiments.

FIG. 3 is a circuit schematic diagram of an output stage circuit 300 usable in charge pump circuit 100 in FIG. 1, in accordance with some embodiments. Components in FIG. 3 that are the same or similar to those in FIG. 2 are given the same reference labels, and detailed description thereof is thus omitted.

Compared with pumping stage circuit 200, output stage circuit 300 does not have control signal terminal CP and driver 244. Capacitive device 224 is coupled between output terminal and a supply reference terminal 310. In some embodiments, supply reference terminal 310 has a voltage level corresponding to a reference ground voltage level or the zero volt level. In some embodiments, supply reference terminal 310 has a voltage level the same as the logic low level.

In operation, output stage circuit 300 stores and holds at capacitive device 224 the charges from a previous pumping stage circuit and outputs a voltage at output terminal OUT having a predetermined pumped voltage level. The capacitance value of the capacitive device 224 in the output stage circuit 300 is set to be sufficiently large to substantially hold the predetermined pumped voltage level while allowing a predetermined current to be drawn by an external circuit.

FIG. 4 is a circuit schematic diagram of a control circuit 400 usable in charge pump circuit 100 in FIG. 1, in accordance with some embodiments.

Control circuit 400 includes a feedback voltage terminal 402, a reference voltage terminal 404, a supply voltage terminal 408, resistive devices 412 and 414, a comparator 420, a signal generation circuit 430, and a plurality of control lines 440. In some embodiments, control circuit 400 includes a clock terminal 406.

Feedback voltage terminal 402 is coupled with output node 104 of charge pump circuit 100. Reference voltage terminal 404 is configured to receive a reference voltage having the reference voltage level $V_{REF}$. Supply voltage terminal 408 is configured to carry a voltage having a supply voltage level. In some embodiments, the supply voltage level is the same as the first logic high level or the second logic high level. Resistive devices 412 and 414 are coupled in series between supply voltage terminal 408 and feedback voltage terminal 402. Resistive devices 412 and 414 are configured as a voltage divider to convert the voltage at output node 104 to a feedback voltage having a voltage level $V_{FB}$ comparable to the reference voltage level $V_{REF}$.

Comparator 420 includes a first input terminal 422, a second input terminal 424, and an output terminal 426. First input terminal 422 is configured to receive the reference voltage (having the reference voltage level $V_{REF}$). Second input terminal 424 is configured to receive the feedback voltage (having the feedback voltage level $V_{FB}$). Comparator 420 compares the values of reference voltage level $V_{REF}$ and feedback voltage level $V_{FB}$ and generates a comparison result at output terminal 426.

Signal generation circuit 430 is coupled with the output terminal 426 of comparator 420 and, if present, clock terminal 406. Signal generation circuit 430 is also coupled with pumping stage circuits 110[1], 110[2], and 110[N] and output stage circuit 120 through the plurality of control lines 440. Signal generation circuit 430 is configured to receive the comparison result at output terminal 426 of comparator 420 and a clock signal CLK from clock terminal 406, and generate control signals SW[1], SW[2], SW[N], SWF, CP[1], CP[2], and CP[N] on the plurality of control lines 440. In some embodiments, signal generation circuit 430 is further configured to receive a clock signal CLK from clock terminal 406.

Control circuit 400 is a non-limiting example. Other types of control circuits usable to generate control signals SW[1], SW[2], SW[N], SWF, CP[1], CP[2], and CP[N] to control charge pump circuit 100 based on the pulse width, frequencies, or amplitude information thereof are within the scope of various embodiments of the present disclosure.

Figure 8:
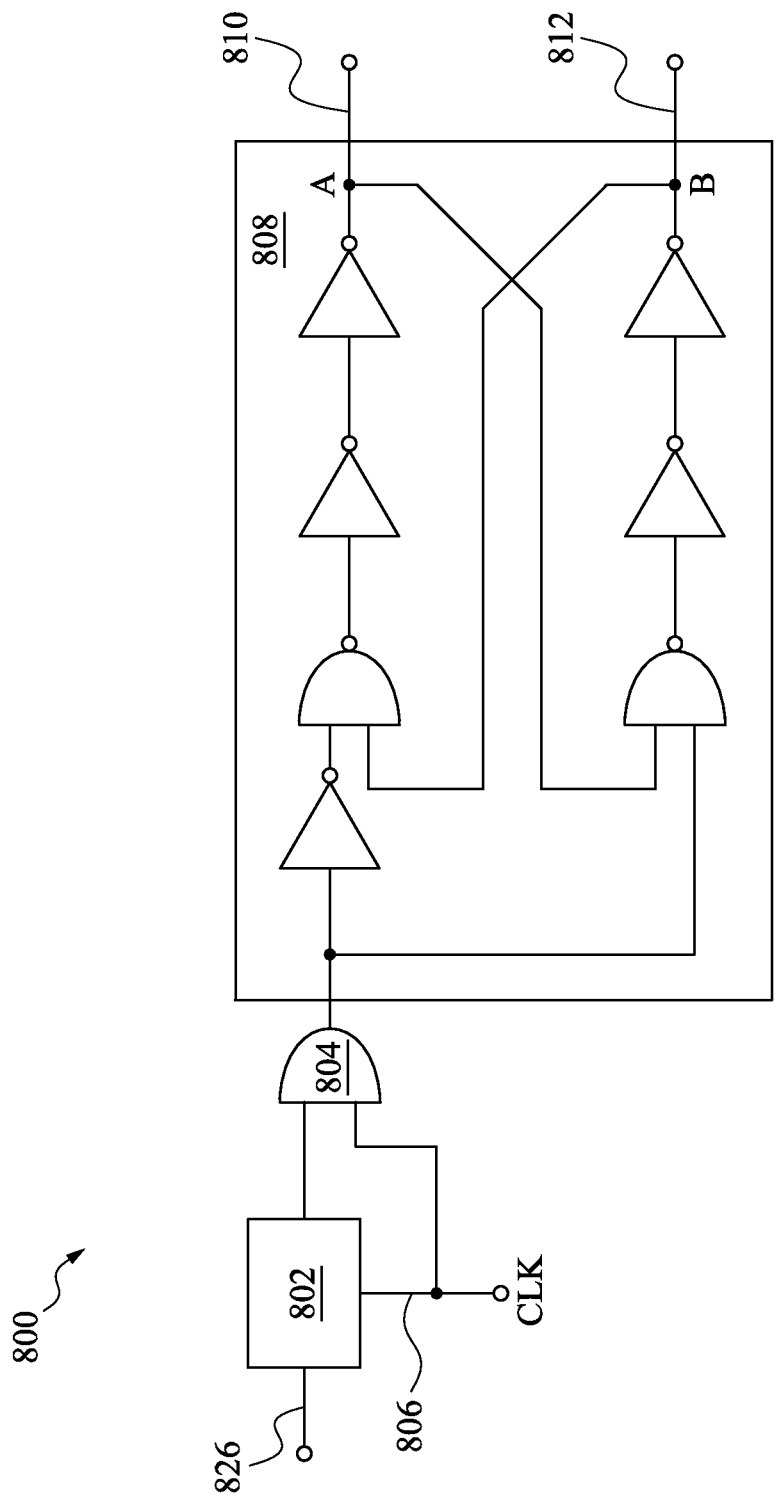
FIG. 8 is a circuit schematic diagram of a signal generation circuit usable in the control circuit of FIG. 4, in accordance with some embodiments.

FIG. 8 is a circuit schematic diagram of an example signal generation circuit 800 usable as a signal generation circuit 430 in the control circuit in FIG. 4, in accordance with some embodiments.

Signal generation circuit 800 includes a D-flip-flop (DFF) 802, an AND gate 804, and a two-phase, non-overlapping clock generator 808. DFF 802 includes a clock input terminal 806 and a comparator input terminal 826. Two-phase, non-overlapping clock generator 808 includes a first output terminal 810 and a second output terminal 812.

DFF 802 is configured to receive clock signal CLK at clock input terminal 806 and to receive a comparator output, e.g. the comparison result at output terminal 426, at logic input terminal 826. DFF 802 samples the comparator output based on clock signal CLK and outputs a sampled comparator output.

AND gate 804 is configured to receive the sampled comparator output from DFF 802 and clock signal CLK, and provide a gated output to two-phase, non-overlapping clock generator 808. In response to a logic high level of the sampled comparator output, AND gate 804 is configured to output a gated clock signal. In response to a logic low level of the sampled comparator output, AND gate 804 is configured to output a logic low level.

Two-phase, non-overlapping clock generator 808 is configured to receive the gated clock signal from AND gate 804, and in response, create a first pulse signal A at first output terminal 810 and a second pulse signal B at second output terminal 812. In some embodiments, first pulse signal A and second pulse signal B are used as charge pump control signals SW[i] and CP[i]. In some embodiments, first output terminal 810 and second output terminal 812 are coupled with the plurality of control lines 440.

In some embodiments, first pulse signal A is used as charge pump control signal SW[i] for even values of i and second pulse signal B is used as charge pump control signal SW[i] for odd values of i.

In some embodiments, first pulse signal A is used as charge pump control signal CP[i] for odd values of i and second pulse signal B is used as charge pump control signal CP[i] for even values of i.

In operation, signal generation circuit 800 responds to the comparator output by generating first pulse signal A and second pulse signal B when feedback voltage level $V_{FB}$ is above reference voltage level $V_{REF}$, and by not generating first pulse signal A and second pulse signal B when feedback voltage level $V_{FB}$ is below reference voltage level $V_{REF}$.

Signal generation circuit 800 is a non-limiting example. Other types of signal generation circuits usable to generate control signals SW[1], SW[2], SW[N], SWF, CP[1], CP[2], and CP[N] to control charge pump circuit 100, including signal generation circuits without a clock signal input, are within the scope of various embodiments of the present disclosure.

Figure 5A:
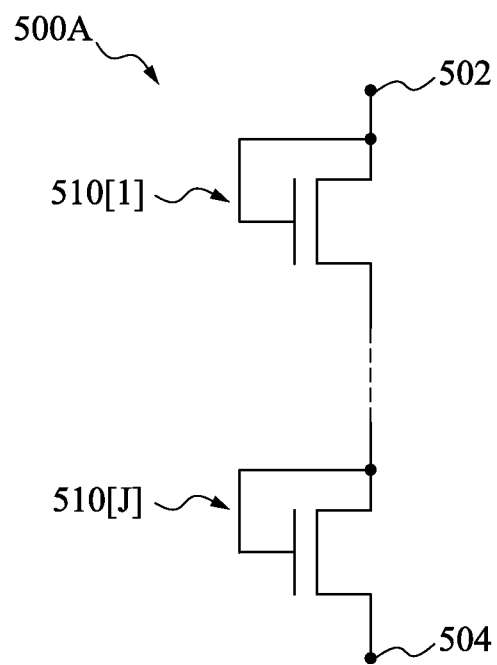
FIGS. 5A and 5B are circuit schematic diagrams of two example diode devices usable as the diode devices in the pumping stage circuit in FIG. 2 or in the output stage circuit in FIG. 3, in accordance with some embodiments.

FIG. 5A is a circuit schematic diagram of an example diode device 500A usable as a diode device 232 or 234 in pumping stage circuit 200 in FIG. 2 or in output stage circuit 300 in FIG. 3, in accordance with some embodiments.

Diode device 500A includes an anode terminal 502, a cathode terminal 504, and J diode-connected P-type transistors 510[1] to 510[J] between anode terminal 502 and cathode terminal 504. J is a positive integer greater than zero. P-type transistors 510[1] to 510[J] are coupled in series when J is greater than one. To implement diode device 232 and diode device 234 using a configuration based on diode device 500A, diode device 232 is configured to have X (J=X) diode-connected transistors 510[1] to 510[X], and diode device 234 is configured to have Y (J=Y) diode-connected transistors 510[1] to 510[Y], where X and Y are positive integers. In some embodiments, diode device 232 has a forward voltage drop VFB1 greater than a forward voltage drop VFB2 of diode device 234. Therefore, Y is set to be less than X.

Figure 5B:
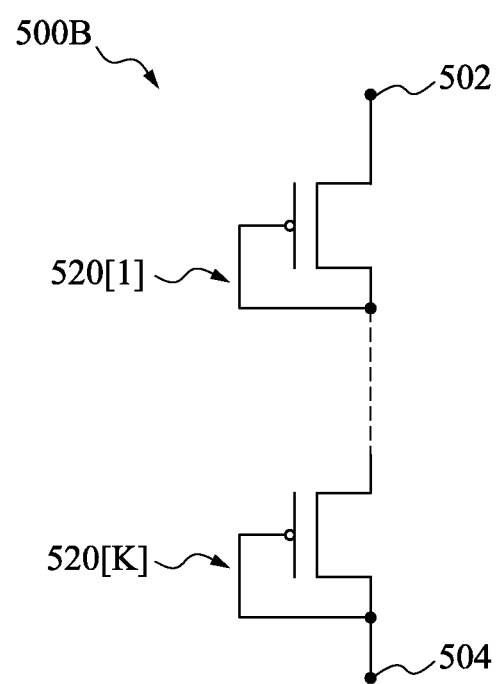

FIG. 5B is a circuit schematic diagram of another example diode device 500B usable as a diode device 232 or 234 in pumping stage circuit 200 in FIG. 2 or in output stage circuit 300 in FIG. 3, in accordance with some embodiments. Components in FIG. 5B that are the same or similar to those in FIG. 5A are given the same reference labels, and detailed description thereof is thus omitted.

Diode device 500B includes K diode-connected N-type transistors 520[1] to 520[K] between anode terminal 502 and cathode terminal 504. K is a positive integer greater than zero. N-type transistors 520[1] to 520[K] are coupled in series when K is greater than one. To implement diode device 232 and diode device 234 using a configuration based on diode device 500B, diode device 232 is configured to have X (K=X) diode-connected transistors 520[1] to 520[X], and diode device 234 is configured to have Y (K=Y) diode-connected transistors 520[1] to 520[Y], where X and Y are positive integers. In some embodiments, diode device 232 has a forward voltage drop $V_{FB1}$ greater than a forward voltage drop $V_{FB2}$ of diode device 234. Therefore, Y is set to be less than X.

In some embodiments, one of diode device 232 or diode device 234 is implemented based on the configuration of diode device 500A, and the other one of diode device 232 or diode device 234 is implemented based on the configuration of diode device 500B. In some embodiments, diode device 232 or diode device 234 is implemented by other types of diode devices different from diode device 500A and diode device 500B.

Figure 6:
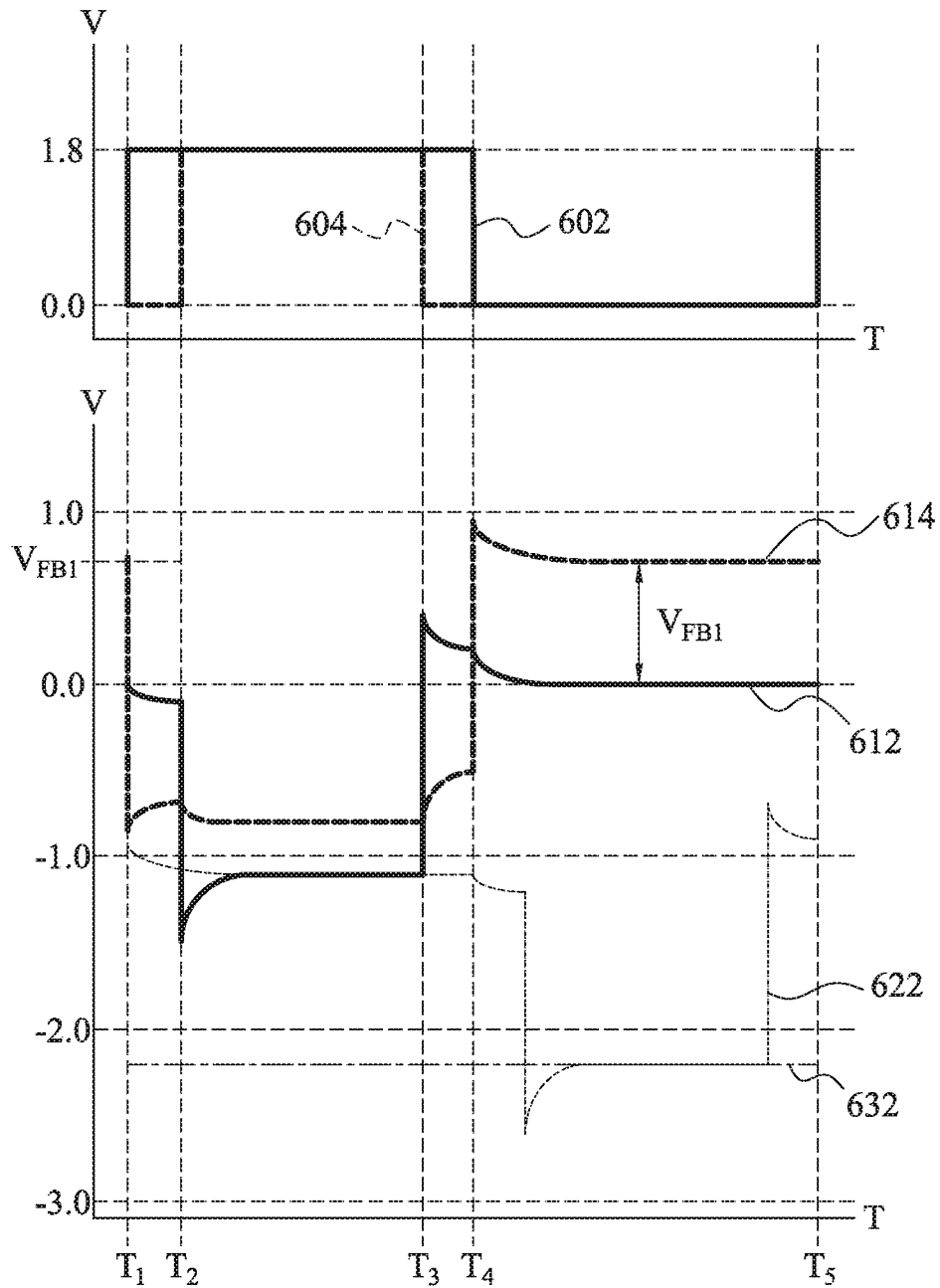
FIG. 6 is a timing diagram of voltage levels at various nodes of the charge pump circuit in FIG. 1, which is further illustrated in conjunction with FIGS. 2-4, in accordance with some embodiments.

FIG. 6 is a timing diagram of voltage levels at various nodes of charge pump circuit 100 in FIG. 1, which is further illustrated in conjunction with FIGS. 2-4, in accordance with some embodiments.

In the example depicted in FIG. 6, the number of pumping stage circuits (i.e., the number N in FIG. 1) is set to be two, and charge pump circuit is configured to be a negative pump. The voltage level $V_{IN}$ is set to be 0 V, and the voltage level $V_{OUT}$ is set to be −2.2 V. The charge pump circuit as illustrated in conjunction with FIGS. 1-4 is also usable as a positive pump. Different configurations and settings of the charge pump circuit 100 are within various embodiments of the present disclosure.

Waveform 602 corresponds to the voltage level of signal $S_1$ of first pumping stage circuit 110[1]. Waveform 604 corresponds to the voltage level of signal $S_2$ of first pumping stage circuit 110[1]. Waveform 612 corresponds to the voltage level of voltage $V_D$ of first pumping stage circuit 110[1]. Waveform 614 corresponds to the voltage level of voltage $V_G$ of first pumping stage circuit 110[1]. Waveform 622 corresponds to the voltage level of voltage $V_D$ of second pumping stage circuit 110[2]. Waveform 632 corresponds to the voltage level of voltage $V_D$ of output stage circuit 120.

The following illustration, if not otherwise specified, is primarily based on the operation of first pumping stage circuit 110[1] using the reference labels from pumping stage circuit 200 in FIG. 2. The operations of transistors 210 and capacitive device 222 of second pumping stage circuit 110[2] and output stage circuit 120 are similar to the operations of transistor 210 and capacitive device 222 of first pumping stage circuit 110[1]. The operation of capacitive device 224 of second pumping stage circuit 110[2] is similar to the operation of capacitive device 224 of first pumping stage circuit 110[1]. Detailed description thereof is thus omitted.

In this embodiment, each signal of signals $S_1$, $S_2$, $S_3$, and $S_4$ has a logic high level of 1.8 volts (V) and a logic low level of 0.0 V. In some embodiments, each signal of signals $S_1$ and $S_3$ has a logic high level different from that of signal $S_2$ and $S_4$. In some embodiments, each signal of signals $S_1$ and $S_3$ has a logic high level of 2.5 V, and each signal of signals $S_2$ and $S_4$ has a logic high level of 1.8 V.

Prior to time $T_1$ during a steady state operation of charge pump circuit 100, signal $S_1$ (waveform 602) and signal $S_2$ (waveform 604) of first pumping stage circuit 110[1] are at the low logic level. Signal $S_3$ (not shown) and signal $S_4$ (not shown) of first pumping stage circuit 110[1] are thus at the signal high level. Voltage $V_D$ of first pumping stage circuit 110[1] is at an input voltage level from a power source or a previous pumping stage circuit, such as 0.0 volt for first pumping stage circuit 110[1] in this example. Also, voltage $V_G$ of first pumping stage circuit 110[1] is at a voltage level that equals the input voltage level plus the forward voltage drop $V_{FB1}$ of diode device 232, such as $V_{FB1}$ in this example. Because forward voltage drop $V_{FB1}$ is set to be greater than threshold voltage $V_{TH}$ of transistor 210, transistor 210 is turned on to pass the input voltage level (e.g., 0.0 V in this example) to voltage $V_D$.

At time $T_1$, signal $S_1$ (waveform 602) transitions from the low logic level to the high logic level. Signal $S_2$ (waveform 604) remains at the low logic level. Signal $S_3$ (not shown) thus transitions from the high logic level to the low logic level while signal $S_4$ (not shown) remains at the signal high level. Through the operation of capacitive device 222 of first pumping stage circuit 110[1], at time $T_1$, voltage $V_G$ (waveform 614) of first pumping stage circuit 110[1] is pushed down by about 1.8 V. Meanwhile, diode device 234 of first pumping stage circuit 110[1] is also providing a discharge path to pull voltage $V_G$ (waveform 614) and voltage $V_D$ (waveform 612) toward each other. As a result of these contradictory pulling forces, at time $T_1$, voltage $V_G$ (waveform 614) transitions from voltage level $V_{FB1}$ to a voltage level that is a few hundred millivolts (mV) higher than a voltage level of voltage level $V_{FB1}$ minus 1.8 V. The voltage differences between the gate terminal of transistor 210 and S/D terminals of transistor 210 are insufficient to turn on transistor 210. Voltage $V_D$ (waveform 614) remains at 0.0 V. Transistor 210 is thus turned off.

After time $T_1$ but before time $T_2$, voltage $V_G$ (waveform 614) and voltage $V_D$ (waveform 612) are pulled toward each other through diode device 234. Transistor 210 remains turned off. In some embodiments, the time period between time $T_1$ and time $T_2$ is set to be insufficient to pull voltage $V_G$ to be sufficiently large to turn on transistor 210 at time $T_2$. In some embodiments, the time period between time $T_1$ and time $T_2$ is sufficiently small that the voltage change of voltage $V_G$ (waveform 614) or the voltage change of voltage $V_D$ (waveform 612) is less than 100 mV.

At time T2, signal S2 (waveform 604) transitions from the low logic level to the high logic level. Signal S1 (waveform 602) remains at the high logic level. Signal S4 (not shown) thus transitions from the high logic level to the low logic level while signal S3 (not shown) remains at the signal low level. Through the operation of capacitive device 224, at time T2, voltage VD (waveform 612) is being pushed down by about 1.8 V. Meanwhile, through the charge sharing between capacitive device 224 and another capacitive device of the next pumping stage circuit (e.g., capacitive device 224 of second pumping stage circuit 110[2]) or a corresponding output stage circuit 120 (e.g., capacitive device 224 of output stage circuit 120), voltage VD is also being pulled toward a steady state output voltage level of this pumping stage, such as −1.1 V in this example. In some embodiments, the charge sharing is also controlled by adjusting the frequencies of control signals SW[1], SW[2], SW[N], SWF, CP[1], CP[2], and CP[N] and/or by adjusting the voltage level of signal S4. Voltage VG (waveform 614) is pulled down slightly at time T2 when diode device 234 goes from conductive to reverse-biased. As a result, at time T2, voltage VD (waveform 612) transitions from 0.0 V to a voltage level that is a few hundred mV higher than a voltage level of −1.8 V. Transistor 210 remains turned off.

After time $T_2$ but before time $T_3$, voltage $V_G$ (waveform 614) remains at about the same voltage level after diode devices 232 and 234 reach their charge balance states after being turned off. Voltage $V_D$ (waveform 612) is pulled toward and then remains at the steady state output voltage level (e.g., −1.1 V in this example). In this example, the voltage level of $V_G$ is greater than the voltage level of $V_D$, but the voltage difference therebetween is insufficient to turn on transistor 210. Transistor 210 remains turned off.

At time $T_3$, signal $S_2$ (waveform 604) transitions from the high logic level to the low logic level. Signal $S_1$ (waveform 602) remains at the high logic level. Signal $S_4$ (not shown) thus transitions from the low logic level to the high logic level while signal $S_3$ (not shown) remains at the signal low level. Through the operation of capacitive device 224, at time $T_3$, voltage $V_D$ (waveform 612) is being pulled up by about 1.8 V. Meanwhile, diode device 234 is also providing a discharge path to pull voltage $V_G$ (waveform 614) and voltage $V_D$ (waveform 612) toward each other. As a result, at time $T_3$, voltage $V_D$ (waveform 612) transitions from the steady state output voltage level (e.g., −1.1 V in this example) to a voltage level that is a few hundred mV lower than a voltage level of 0.7 V (i.e, −1.1 V plus 1.8 V). The voltage differences between the gate terminal of transistor 210 and S/D terminals of transistor 210 are insufficient to turn on transistor 210. Transistor 210 remains turned off.

After time $T_3$ but before time $T_4$, voltage $V_G$ (waveform 614) and voltage $V_D$ (waveform 612) are pulled toward each other through diode device 234. Transistor 210 remains turned off. In some embodiments, the time period between time $T_3$ and time $T_4$ is sufficiently small that the voltage change of voltage $V_G$ (waveform 314) or the voltage change of voltage $V_D$ (waveform 612) is less than 100 mV.

At time $T_4$, signal $S_1$ (waveform 602) transitions from the high logic level to the low logic level. Signal $S_2$ (waveform 604) remains at the low logic level. Signal $S_3$ (not shown) thus transitions from the low logic level to the high logic level while signal $S_4$ (not shown) remains at the signal high level. Through the operation of capacitive device 222, at time $T_4$, voltage $V_G$ (waveform 614) is being pulled up by about 1.8 V. Meanwhile, diode device 232 is also providing a discharge path to pull voltage $V_G$ (waveform 614) toward voltage $V_D$. As a result, at time $T_4$, voltage $V_G$ (waveform 614) transitions to a voltage level that is a few hundred mV higher than voltage level $V_{FB1}$. The voltage difference between the gate terminal of transistor 210 and S/D terminal 216 is sufficient to turn on transistor 210.

After time $T_4$ but before time $T_5$, voltage $V_D$ (waveform 612) is pulled toward and then remains at the steady state input voltage level (e.g., 0 V in this example), and voltage $V_G$ (waveform 614) is pulled toward and then remains at about forward voltage drop $V_{FB1}$ of diode device 232 plus the steady state input voltage level. Transistor 210 remains turned on.

At time $T_5$, the next operation cycle of pumping stage circuit 200 begins. Time $T_5$ corresponds to time $T_1$ of the next operation cycle.

Second pumping stage circuit 110[2] is operated in a manner similar to first pumping stage circuit 110[1], except the corresponding control signals thereof are non-overlapping signals to the counterpart signals of first pumping stage circuit 110[1]. As a result, voltage $V_D$ of pumping stage circuit 110[2] (waveform 622) is at −1.1V during time $T_1$ to time $T_4$ and is pumped to −2.2 V during time $T_4$ to time $T_5$. Transistor 210 of output stage circuit 120 is operated in a manner similar to transistor 210 of first input stage 110[1]. Capacitive device 224 of output stage circuit 120 is configured to hold the voltage level of voltage $V_D$ at −2.2 V when transistor 210 of output stage circuit 120 is turned off during time $T_1$ to time $T_4$. Capacitive device 224 of output stage circuit 120 is also configured to receive the charges from the capacitive device 224 of second pumping stage circuit 110[2] when transistor 210 of output stage circuit 120 is turned on during time $T_4$ to time $T_5$. As a result, voltage $V_D$ of output stage circuit 120 remains at −2.2 V.

As depicted in FIG. 6 and FIG. 2, through the discharge path provided by diode device 232 and the DC separation between gate terminal 212 of transistor 210 and the output terminal of driver 242 (i.e., signal $S_3$), the voltage difference between gate terminal 212 and S/D terminal 216 and the voltage difference between gate terminal 212 and S/D terminal 214 when transistor 210 is turned on is kept at about forward voltage drop $V_{FB1}$ of diode device 232. In some embodiments, forward voltage drop $V_{FB1}$ of diode device 232 is set to be less than the logic high level, such as 1.8 V in this example. For a pump stage circuit at a later stage of the charge pump circuit 100 or the output stage circuit 120, regardless the corresponding input voltage level or the pumped voltage level, a transistor corresponding to transistor 210 thus has a gate terminal to S/D terminal voltage adjusted by forward voltage drop $V_{FB1}$ of diode device 232, which is less than the logic high level when the transistor 210 is turned on.

Figure 7:
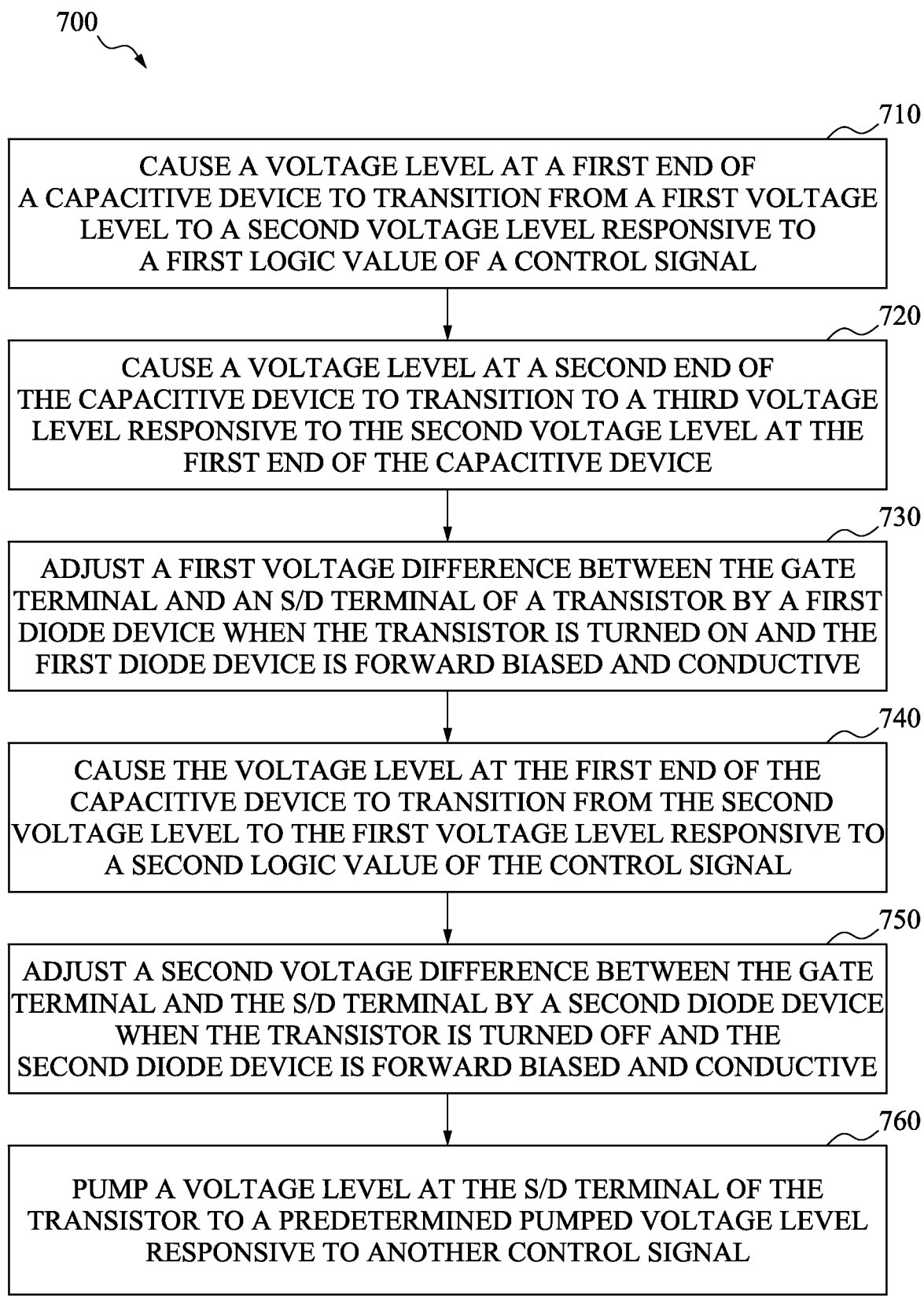
FIG. 7 is a flow chart of a method of operating a pumping stage circuit in FIG. 2, in accordance with some embodiments.

FIG. 7 is a flow chart of a method 700 of operating a pumping stage circuit in FIG. 2, in accordance with some embodiments. FIG. 7 is illustrated in conjunction with the example depicted in FIG. 2. It is understood that additional operations may be performed before, during, and/or after the method 700 depicted in FIG. 7, and that some other processes may only be briefly described herein.

Method 700 begins with operation 710, where a voltage level at a first end of a capacitive device, such as signal $S_3$ between driver 242 and capacitive device 222, is caused to transition from a first voltage level to a second voltage level responsive to a first logic value of a control signal. In some embodiments, the first voltage level corresponds to a logic low level, the second voltage level corresponds to a logic high level, the control signal corresponds to signal $S_1$, and the first logic value corresponds to a logic low value.

Method 700 proceeds to operation 720, where a voltage level at a second end of capacitive device 222, such as voltage $V_G$, is caused to transition to a third voltage level responsive to the second voltage level at the first end of the capacitive device. The second end of capacitive device 222 is electrically coupled with a gate terminal 212 of a transistor 210.

In some embodiments, operations 710 and 720 correspond to the signal transitions at time $T_4$ in the timing diagram in FIG. 6.

Method 700 proceeds to operation 730, where a first voltage difference between gate terminal 212 and a source/drain (S/D) terminal 216 of transistor 210 is adjusted by a first diode device, such as diode device 232, when transistor 210 is turned on and first diode device 232 is forward biased and conductive. First diode device 232 has an anode coupled with gate terminal 212 of transistor 210 and a cathode coupled with S/D terminal 216 of transistor 210. In some embodiments, operation 730 corresponds to the signal transitions from time $T_4$ to time $T_5$ in the timing diagram in FIG. 6.

Method 700 proceeds to operation 740, where a voltage level (e.g., signal $S_3$) at the first end of capacitive device 222 is caused to transition from the second voltage level to the first voltage level responsive to a second logic value of a control signal. In some embodiments, the second logic value corresponds to a logic high value. As a result, voltage $V_G$ is caused to transition to a fourth voltage level that is insufficient to turn on transistor 210. In some embodiments, operation 740 corresponds to the signal transitions at time $T_1$ in the timing diagram in FIG. 6.

Method 700 proceeds to operation 750, where a second voltage difference between S/D terminal 216 of the transistor 210 and gate terminal 212 of transistor 201 is adjusted by a second diode device, such as diode device 234, when the transistor 210 is turned on and the second diode device 234 is forward biased and conductive. Second diode device 234 has an anode coupled with the S/D terminal 216 of the transistor 210 and a cathode coupled with the gate terminal 212 of the transistor 210. In some embodiments, operation 750 corresponds to the signal transitions from time $T_1$ to time $T_2$ and/or from time $T_3$ to time $T_4$ in the timing diagram in FIG. 6.

In some embodiments, first diode device 232 has a forward voltage drop $V_{FB1}$, second diode device 234 has a forward voltage drop $V_{FB2}$, and forward voltage drop $V_{FB1}$ is greater than forward voltage drop $V_{FB2}$. Also, transistor 210 has a threshold voltage $V_{TH}$ between gate terminal 212 and S/D terminal 216. In some embodiments, forward voltage drop $V_{FB1}$ is greater than threshold voltage $V_{TH}$ of transistor 210.

In some embodiments, operations 710-750 are applicable to a method of operating an output stage circuit 300 in FIG. 3.

Method 700 proceeds to operation 760, where a voltage level at S/D terminal 216 of transistor 210 is pumped to a predetermined pumped voltage level in response to another control signal, such as control signal $S_2$. In some embodiments, operation 760 corresponds to the signal transitions from time $T_2$ to time $T_3$ in the timing diagram in FIG. 6.

In accordance with one embodiment, a charge pump circuit includes a sub-circuit, which is a pumping stage circuit or an output stage circuit. The sub-circuit includes an input terminal, an output terminal, a transistor, a first capacitive device, a first diode device, and a second diode device. The transistor has a first source/drain (S/D) terminal coupled with the input terminal, a second S/D terminal coupled with the output terminal, and a gate terminal. The first capacitive device has a first end coupled with the gate terminal of the transistor and a second end configured to receive a first driving signal. The first diode device has a cathode coupled with the second S/D terminal of the transistor and an anode coupled with the gate terminal of the transistor. The second diode device has a cathode coupled with the gate terminal of the transistor and an anode coupled with the second S/D terminal of the transistor.

In accordance with another embodiment, a charge pump circuit includes an input node, an output node, N pumping stage circuits, and an output stage circuit. N is a positive integer greater than zero. Each pumping stage circuit of the N pumping stage circuits includes an input terminal and an output terminal. The output stage circuit includes an input terminal and an output terminal. The input terminal of a first pumping stage circuit of the N pumping stage circuits is coupled with the input node. The output terminal of a n-th pumping stage circuit of the N pumping stage circuits is coupled with the input terminal of a (n+1)-th pumping stage circuit of the N pumping stage circuits, where n is a positive integer and 1≤n≤(N−1). The output terminal of the N-th pumping stage circuit of the N pumping stage circuits is coupled with the input terminal of the output stage circuit. The output terminal of the output stage circuit is coupled with the output node. One of the N pumping stage circuits further includes a transistor, a first capacitive device, a second capacitive device, a first diode device, and a second diode device. The transistor has a first source/drain (S/D) terminal coupled with the input node of the one of the N pumping stage circuits, a second S/D terminal coupled with the output node of the one of the N pumping stage circuits, and a gate terminal. The first capacitive device has a first end coupled with the gate terminal of the transistor and a second end configured to receive a first driving signal. The second capacitive device has a first end coupled with the output node of the one of the N pumping stage circuits and a second end configured to receive a second driving signal. The first diode device has a cathode coupled with the second S/D terminal of the transistor and an anode coupled with the gate terminal of the transistor. The second diode device has a cathode coupled with the gate terminal of the transistor and an anode coupled with the second S/D terminal of the transistor.

In accordance with another embodiment, a method of operating a pumping stage circuit or an output stage circuit of a charge pump circuit is disclosed. The method includes causing a voltage level at a first end of a capacitive device to transition from a first voltage level to a second voltage level responsive to a first logic value of a control signal. The method also includes causing a voltage level at a second end of the capacitive device to transition to a third voltage level responsive to the second voltage level at the first end of the capacitive device, the second end of the capacitive device being electrically coupled with a gate terminal of a transistor; and adjusting a first voltage difference between the gate terminal and a source/drain (S/D) terminal of the transistor by a first diode device when the transistor is turned on and the first diode device is forward biased and conductive. The first diode device has an anode coupled with the gate terminal of the transistor and a cathode coupled with the S/D terminal of the transistor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A charge pump circuit, comprising:
   an input node;
   an output node;
   a pumping stage circuit configured to receive a first control signal;
   an output stage circuit configured to receive the first control signal, the output stage circuit comprising an output-stage output terminal directly connected to the output node;
   a sub-circuit being the pumping stage circuit or the output stage circuit, the sub-circuit comprising:
      an input terminal;
      an output terminal being the output-stage output terminal when the sub-circuit is the output stage circuit;
      a transistor having a first source/drain (S/D) terminal directly connected to the input terminal, a second S/D terminal directly connected to the output terminal, and a gate terminal;
      a first capacitive device having a first end coupled with the gate terminal of the transistor and a second end configured to receive a first driving signal based on the first control signal;
      a second capacitive device having a first end directly connected to the output terminal and a second end configured to receive a second driving signal based on a second control signal when the sub-circuit is the pumping stage circuit and a reference ground voltage level when the sub-circuit is the output stage circuit;
      a first diode device having a cathode directly connected to the second S/D terminal of the transistor and the first end of the second capacitive device, and an anode coupled with the gate terminal of the transistor; and
      a second diode device having a cathode coupled with the gate terminal of the transistor and an anode directly connected to the second S/D terminal of the transistor and the first end of the second capacitive device; and
   a control circuit configured to generate the first control signal comprising a first transition from a first logic level to a second logic level at a first time and the second control signal comprising a second transition from the first logic level to the second logic level at a second time,
   wherein
   a time period between the first and second transitions is sufficiently small to cause a change in a voltage at the second S/D terminal of the transistor from the first time to the second time to be less than 100 millivolts.

2. The charge pump circuit of claim 1, wherein
   the sub-circuit is the pumping stage circuit,
   and
   the sub-circuit further comprises:
      a first driver configured to generate the first driving signal based on the first control signal; and
      a second driver configured to generate the second driving signal based on the second control signal.

3. The charge pump circuit of claim 2, wherein
   the first driver is configured to cause the first driving signal to switch between a first voltage level corresponding to a logic high value and a second voltage level corresponding to a logic low value; and
   the second driver is configured to cause the second driving signal to switch between a third voltage level corresponding to the logic high value and the second voltage level corresponding to the logic low value, the first voltage level and the third voltage level being different from each other.

4. The charge pump circuit of claim 1, wherein
   the first diode device comprises X diode-connected transistors, X being a positive integer greater than one; and
   the second diode device comprises Y diode-connected transistors, Y being a positive integer greater than zero and less than X, and the Y diode-connected transistors being connected in series when Y is greater than one.

5. The charge pump circuit of claim 1, wherein the transistor is an N-type transistor.

6. A charge pump circuit, comprising:
   an input node;
   an output node;

a control circuit configured to output a first control signal comprising a first transition from a first logic level to a second logic level at a first time and a second control signal comprising a second transition from the first logic level to the second logic level at a second time;

N pumping stage circuits, N being a positive integer greater than zero, each pumping stage circuit of the N pumping stage circuits comprising:
an input terminal; and
an output terminal; and an output stage circuit, comprising:
an input terminal;
an output terminal; and
a first transistor having a first source/drain (S/D) terminal directly connected to the input terminal and a second S/D terminal directly connected to the output terminal, wherein
the input terminal of a first pumping stage circuit of the N pumping stage circuits is coupled with the input node;
the output terminal of a n-th pumping stage circuit of the N pumping stage circuits is coupled with the input terminal of a (n+1)-th pumping stage circuit of the N pumping stage circuits, n being a positive integer and $1 \leq n \leq (N-1)$;
the output terminal of the N-th pumping stage circuit of the N pumping stage circuits is coupled with the input terminal of the output stage circuit;
the output terminal of the output stage circuit is directly coupled with the output node;
one of the N pumping stage circuits further comprises:
a second transistor having a first S/D terminal coupled with the input node of the one of the N pumping stage circuits, a second S/D terminal coupled with the output node of the one of the N pumping stage circuits, and a gate terminal;
a first capacitive device having a first end coupled with the gate terminal of the second transistor and a second end configured to receive a first driving signal based on the first control signal;
a second capacitive device having a first end directly coupled with the output node of the one of the N pumping stage circuits and a second end configured to receive a second driving signal based on the second control signal;
a first diode device having a cathode coupled with the second S/D terminal of the second transistor and an anode coupled with the gate terminal of the second transistor; and
a second diode device having a cathode coupled with the gate terminal of the second transistor and an anode coupled with the second S/D terminal of the second transistor;
the output stage circuit further comprises:
the first diode device having the cathode coupled with the second S/D terminal of the first transistor and the anode coupled with the gate terminal of the first transistor;
the second diode device having the cathode coupled with the gate terminal of the first transistor and the anode coupled with the second S/D terminal of the first transistor; and
the second capacitive device having the first end directly connected to the second S/D terminal of the first transistor, the cathode of the first diode device, and the anode of the second diode device, and the second end configured to receive a reference voltage level; and
a time period between the first and second transitions is sufficiently small to cause a change in a voltage at the second S/D terminal of the second transistor from the first time to the second time to be less than 100 millivolts.

7. The charge pump circuit of claim 6, wherein the one of the N pumping stage circuits further comprises:
a first driver configured to generate the first driving signal based on the first control signal; and
a second driver configured to generate the second driving signal based on the second control signal.

8. The charge pump circuit of claim 7, wherein
the first driver comprises a first inverter; and
the second driver comprises a second inverter.

9. The charge pump circuit of claim 7, wherein
the first driver is configured to cause the first driving signal to switch between a first voltage level corresponding to a logic high value and a second voltage level corresponding to a logic low value; and
the second driver is configured to cause the second driving signal to switch between a third voltage level corresponding to the logic high value and the second voltage level corresponding to the logic low value, the first voltage level and the third voltage level being different from each other.

10. The charge pump circuit of claim 6, wherein
the first diode device comprises X diode-connected transistors, X being a positive integer greater than one; and
the second diode device comprises Y diode-connected transistors, Y being a positive integer greater than zero and less than X, and the Y diode-connected transistors being connected in series when Y is greater than one.

11. The charge pump circuit of claim 6, wherein the second transistor is an N-type transistor.

12. The charge pump circuit of claim 6, wherein
the input node is configured to receive an input voltage; and
the output node is configured to output a pumped voltage, a voltage level of the pumped voltage being lower than a voltage level of the input voltage.

13. A method of operating a charge pump circuit, the method comprising:
generating a first transition in a first control signal from a first predetermined voltage level to a second predetermined voltage level at a first time;
generating a second transition in a second control signal from the first predetermined voltage level to the second predetermined voltage level at a second time; and
operating each of a pumping stage circuit of the charge pump circuit and an output stage circuit of the charge pump circuit by:
causing a voltage level at a first end of a first capacitive device to transition from a first voltage level to a second voltage level responsive to the transition in the control signal;
causing a voltage level at a second end of the first capacitive device to transition to a third voltage level responsive to the second voltage level at the first end of the first capacitive device, the second end of the first capacitive device being electrically coupled with a gate terminal of a transistor; and
adjusting a first voltage difference between the gate terminal and a source/drain (S/D) terminal of the transistor by a first diode device when the transistor is turned on and the first diode device is forward biased and conductive,
wherein
the first diode device comprises an anode coupled with the gate terminal of the transistor and a cathode directly connected to the S/D terminal of the transistor,
the operating the pumping stage circuit comprises:
  using a second capacitive device to directly control a voltage level at the S/D terminal of the transistor in response to the second control signal,
  wherein a time period between the first and second transitions is sufficiently small to cause a change in a voltage at the S/D terminal of the transistor from the first time to the second time to be less than 100 millivolts, and
the operating the output stage circuit comprises:
  coupling a first end of a third capacitive device directly to the cathode of the first diode device and the S/D terminal of the transistor,
  coupling a second end of the third capacitive device to a reference voltage level, and
  outputting a generated voltage level from the S/D terminal of the transistor directly to an output node of the charge pump circuit.

14. The method of claim 13, further comprising:
adjusting a second voltage difference between the S/D terminal and the gate terminal of the transistor by a second diode device when the transistor is turned off and the second diode device is forward biased and conductive, the second diode device having an anode coupled with the S/D terminal of the transistor and a cathode coupled with the gate terminal of the transistor.

15. The charge pump circuit of claim 1, wherein
the sub-circuit further comprises a driver configured to generate the first driving signal having a voltage level corresponding to a logic high value and a reference voltage level corresponding to a logic low value; and
a forward voltage drop of the first diode device is less than the voltage level.

16. The charge pump circuit of claim 6, wherein
the one of the N pumping stage circuits comprises a driver configured to generate the first driving signal having a first voltage level corresponding to a logic high value and a second voltage level corresponding to a logic low value; and
a forward voltage drop of the first diode device is less than the first voltage level.

17. The method of claim 13, wherein the adjusting the first voltage difference is based on a forward voltage drop of a plurality of diode-connected transistors being less than a difference between the first voltage level and the second voltage level.

18. The charge pump circuit of claim 1, wherein
the sub-circuit further comprises a driver configured to generate the first driving signal based on the first control signal having a first voltage level corresponding to a logic high value,
the first driving signal has a second voltage level corresponding to the logic high value, and
the first voltage level is greater than the second voltage level.

19. The charge pump circuit of claim 7, wherein
each of the first control signal and the second control signal has a first voltage level corresponding to a logic high value and a second voltage level corresponding to a logic low value,
the first driver is configured to generate the first driving signal having a third voltage level corresponding to the logic high value and the second voltage level corresponding to the logic low value,
the second driver is configured to generate the second driving signal having the third voltage level corresponding to the logic high value and the second voltage level corresponding to the logic low value, and
the first voltage level is greater than the third voltage level.

20. The charge pump circuit of claim 1, wherein the control circuit is configured to generate the first control signal
  as a pulse signal in response to a first result of a comparison between a reference voltage level and a feedback voltage level based on an output voltage on the output node, and
  as a voltage level corresponding to a logic low value in response to a second result of the comparison different from the first result.

* * * * *